United States Patent
Jiménez et al.

(10) Patent No.: US 11,765,053 B2
(45) Date of Patent: Sep. 19, 2023

(54) DISTRIBUTED COMPUTATION ORCHESTRATION FOR INTERNET-OF-THINGS DEVICES USING COAP AND LWM2M PROTOCOLS

(71) Applicant: Telefonaktiebolaget LM Ericsson (publ), Stockholm (SE)

(72) Inventors: Jaime Jiménez, Espoo (FI); Hiroshi Doyu, Espoo (FI); Roberto Morabito, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/774,213

(22) PCT Filed: Nov. 4, 2019

(86) PCT No.: PCT/SE2019/051107
§ 371 (c)(1),
(2) Date: May 4, 2022

(87) PCT Pub. No.: WO2021/091436
PCT Pub. Date: May 14, 2021

(65) Prior Publication Data
US 2022/0407786 A1 Dec. 22, 2022

(51) Int. Cl.
*H04L 41/5041* (2022.01)
*H04W 4/70* (2018.01)
*H04L 41/5054* (2022.01)

(52) U.S. Cl.
CPC ...... *H04L 41/5048* (2013.01); *H04L 41/5054* (2013.01); *H04W 4/70* (2018.02)

(58) Field of Classification Search
CPC ... H04L 41/5048; H04L 41/5054; H04W 4/70
See application file for complete search history.

(56) References Cited

U.S. PATENT DOCUMENTS 10,834,266 B2 * 11/2020 Livanos .............. H04M 15/771
2015/0072677 A1 3/2015 Yang
(Continued)

FOREIGN PATENT DOCUMENTS

CN 109996219 A 7/2019
EP 3247088 A1 11/2017
(Continued)

OTHER PUBLICATIONS

International Search Report and Written Opinion of the International Searching Authority for PCT International Application No. PCT/SE2019/051107 dated Nov. 12, 2020.
(Continued)

*Primary Examiner* — Blake J Rubin
(74) *Attorney, Agent, or Firm* — SAGE PATENT GROUP (57) ABSTRACT

An IoT electronic device executes services distributed by an IoT service orchestration device. A Lightweight Machine-to-Machine (LwM2M) request message is received. The LwM2M request message contains a LwM2M object identifying hardware resources of the IoT electronic device for which characteristics are requested. A LwM2M command is executed that accesses a LwM2M interface identified based on content of the LwM2M object to determine the characteristics of the hardware resources of the IoT electronic device which are identified by the LwM2M object. A response message contains information identifying the characteristics of the hardware resources of the IoT electronic device. The response message is communicated toward the IoT service orchestrator device. A service image is received for execution which is adapted by the IoT service orchestrator device, responsive to the information in the response message identifying the characteristics of the hardware resources of the IoT electronic device.

14 Claims, 7 Drawing Sheets

(56) References Cited

U.S. PATENT DOCUMENTS

| | | | |
|---|---|---|---|
| 2017/0223479 A1* | 8/2017 | Ly | G06F 9/54 |
| 2017/0364377 A1* | 12/2017 | Koller Jemio | G06F 8/54 |
| 2018/0007172 A1 | 1/2018 | Wang et al. | |
| 2018/0097695 A1 | 4/2018 | Bender et al. | |
| 2019/0109821 A1* | 4/2019 | Clark | H04L 63/0414 |
| 2019/0319860 A1 | 10/2019 | Seed et al. | |
| 2020/0145337 A1* | 5/2020 | Keating | G06F 9/5011 |
| 2020/0193065 A1* | 6/2020 | Smith | H04L 9/3242 |
| 2020/0228478 A1* | 7/2020 | Ros | H04L 51/066 |
| 2020/0329013 A1 | 10/2020 | Zhou | |
| 2020/0379747 A1* | 12/2020 | Kaartinen | G06F 8/65 |
| 2021/0160344 A1* | 5/2021 | Piikivi | H04L 67/12 |

FOREIGN PATENT DOCUMENTS

| | | |
|---|---|---|
| WO | 2019055004 A1 | 3/2019 |
| WO | 2019075317 A1 | 4/2019 |
| WO | 2019128982 A1 | 7/2019 |

OTHER PUBLICATIONS

Madhavapeddy et al., "Jitsu: Just-In-Time Summoning of Unikernels," 12th USENIX Symposium on Networked Systems Design and Implementation (NSDI '15). May 4-6, 2015, Oakland, CA, USA, pp. 559-573.

Madhavapeddy et al., "Unikernels: Library Operating Systems for the Cloud," ASPLOS'13, Mar. 16-20, 2013, Houston, Texas, USA, pp. 1-12.

Bormann et al., "Terminology for Constrained-Node Networks," IETF, RFC 7228, May 2014, pp. 1-17.

"Unikernel," Wikipedia, page last edited on Dec. 19, 2019, 7 pages.

Cozzolino et al., "FADES: Fine-Grained Edge Offloading with Unikernels," HotConNet '17, Aug. 25, 2017, Los Angeles, CA, USA, pp. 36-41.

Open Mobile Alliance, "Lightweight Machine to Machine Technical Specification: Core," Approved Version: 1.1—Jul. 10, 2018, 121 pages.

Extended European Search Report dated Jul. 29, 2022 for European Patent Application No. 19951751.7, 8 pages.

* cited by examiner

DISTRIBUTED COMPUTATION ORCHESTRATION FOR INTERNET-OF-THINGS DEVICES USING COAP AND LWM2M PROTOCOLS

CROSS REFERENCE TO RELATED APPLICATION

This application is a 35 U.S.C. § 371 national stage application of PCT International Application No. PCT/SE2019/051107 filed on Nov. 4, 2019, the disclosure and content of which is incorporated by reference herein in its entirety.

TECHNICAL FIELD

The present disclosure relates to distributed computing systems, and in particular to orchestrating distributed computing among Internet-of-Things Devices.

BACKGROUND

A unikernel is a specialized, single address space machine image constructed by using library operating systems. A developer selects, from a modular stack, the minimal set of libraries which correspond to the OS constructs required for their application to run. These libraries are then compiled with the application and configuration code to build sealed, fixed-purpose images (unikernels) which run directly on a hypervisor or hardware without an intervening operating system (OS) such as Linux or Windows. Two types of Unikernel are: one with posix compliance for backward compatibility; and another that is programming language specific for size conciseness. Unikernel-based applications are in general single-purpose appliances that are at compile time a compiled into specialized standalone kernels, and sealed against modification after deployment.

The concept of unikernels has emerged from the observation that most applications running on cloud-based resource do not require many of the services provided by common operating systems. Additionally, unikernels provide increased security by having a reduced attackable interface surface, and can provide better processing performance by not including unnecessary components from the applications. Unikernels were designed initially for cloud-based computing but their small footprint and flexibility make them an attractive approach for emerging Internet-of-Things (IoT) edge ecosystems. Some main differences that arise between existing unikernel implementations are due to the underlying programming language used. MirageOS and HaLVM are unikernels based on functional languages with pervasive type-safety in the running code. Other solutions like IncludeOS and ClickOS are C++ unikernels; the former offering a C++ platform to which bind generic applications, while the latter is highly specializing in offering dynamic network processing (based on Click modular router). OSv is based on Java and therefore heavier than the others, but more flexible. Security and unikernels are tightly coupled. The attackable interface surface of a unikernel is strictly confined to the application embedded within. There is no uniform operating layer in a unikernel, and everything is directly compiled into the application layer. Therefore, each unikernel may have a different set of vulnerabilities, which implies that an exploit that can penetrate one may not be threatening the others. Unikernels are principally designed to be stateless. Their stateless nature facilitates use in many types of algorithms, e.g. compression, encryption, data aggregation functions, and use in many types of system functions, e.g., Network Function Virtualization (NFV).

The Constrained Application Protocol (CoAP) is a generic Representational State Transfer (REST) application Protocol for constrained devices, it is defined in RFC7252. CoAP is designed to be used over User Datagram Protocol (UDP) (RFC0768) over the Internet.

On current deployments CoAP variants like Lightweight Machine to Machine Protocol (LwM2M) are becoming increasingly popular in order to manage devices in a RESTful fashion.

The usage of Unikernel in the context of IoT has been limited for reasons that include that the employment of alternative virtualization technologies, such as container-based virtualization, has had a disruptive rise recently, and success of open-source communities to continually improve fully featured management frameworks. Unikernels have not appeared to be sufficiently mature to be included in production-ready environments, and a greater effort has been believed to be needed to reach the same degree of portability of containers. Packaging applications through Unikernels may require implementation efforts that could slow down, and in many cases limit, the adaptability toward existing software and hardware platforms. This difference mainly arises as a result of the differences in the ways in which the two technologies are built.

Containers are application independent, while Unikernels are limited by the programming language and libraries exposed by the underlying minimalistic operating system (OS). There are also additional main constraints that limit the use of Unikernel in more sophisticated systems. First, Unikernels are intended to be single process applications. In fact, a single Unikernel can have difficulty handling multiple complex processes due to the lack of a dedicated process management system. Second, Unikernels are single-user applications and do not provide authentication mechanisms to verify the user's identity. This feature discourages the use of this technology for multi-user systems. Third, most of the Unikernel projects feature a limited library ecosystem, where the callable functions are still only a subset of those available in a fully mature OS. Finally, additional potential disadvantages of Unikernel when compared to container-based virtualization, can include the lack of orchestration tools and the static resource allocation for the initialized instances.

In view of the rapidly increasing interests in Unikernel that is an urgent need to enable lightweight Unikernels that can support more advanced functionalities.

SUMMARY

Some embodiments disclosed herein are directed to a method by an IoT electronic device for executing services distributed by an IoT service orchestration device to a plurality of the IoT electronic devices. The method includes receiving a Lightweight Machine-to-Machine (LwM2M) request message through the Internet from the IoT service orchestration device. The LwM2M request message contains a LwM2M object identifying a group of hardware resources of the IoT electronic device for which characteristics are requested. The method executes a LwM2M command that accesses a LwM2M interface identified based on content of the LwM2M object to determine the characteristics of the group of hardware resources of the IoT electronic device which are identified by the LwM2M object. The method generates a response message containing information identifying the characteristics of the group of hardware resources of the IoT electronic device which are determined through the LwM2M interface access. The method communicates the response message through the Internet directed toward the IoT service orchestrator device. The method receives a service image which has been adapted by the IoT service orchestrator device, responsive to the information in the response message identifying the characteristics of the group of hardware resources of the IoT electronic device, for execution by the IoT electronic device.

Potential advantages of this method include that the LwM2M protocol is modified in a way that enables the IoT electronic device to determine characteristics of particular hardware resources, and to communicate information indicating those hardware resource characteristics to the IoT service orchestrator device. The IoT service orchestrator device can use the modified LwM2M protocol to determine the characteristics of hardware resources of the IoT electronic device, and to generate a service image which has been adapted responsive to those characteristics for execution by the IoT electronic device.

Some other embodiments are directed to a method by an IoT service orchestration device for distributing services via the Internet to a plurality of IoT electronic devices. The method includes generating a LwM2M request message containing a LwM2M object identifying a group of hardware resources for which characteristics are requested. The method communicates the LwM2M request message through the Internet directed toward an identified IoT electronic device among the IoT electronic devices. The method receives a response message, through the Internet from the identified IoT electronic device, containing information identifying the characteristics of the group of hardware resources determined through execution of a LwM2M command by the identified IoT electronic device based on the LwM2M object. The method generates a service image that is adapted based on the information identifying the characteristics of the group of hardware resources. The service image contains instructions that are executable by the identified IoT electronic device. The method communicates the service image through the Internet directed toward the identified IoT electronic device.

Related IoT electronic devices and IoT service orchestrator devices are disclosed. It is noted that aspects described with respect to one embodiment may be incorporated in different embodiments although not specifically described relative thereto. That is, all embodiments and/or features of any embodiments can be combined in any way and/or combination. Moreover, other IoT electronic devices, IoT service orchestrator devices, and corresponding methods and computer program products according to embodiments will be or become apparent to one with skill in the art upon review of the following drawings and detailed description. It is intended that all such additional IoT electronic devices, IoT service orchestrator devices, and corresponding methods and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Embodiments of the present disclosure are directed to providing improved orchestration of services that are distributed for execution by Internet-of-Things (IoT) electronic devices.

Problems with Previously Known Approaches

Although execution of Unikernel can be orchestrated for distributed computing via existing container frameworks/standards, those existing container frameworks/standards result in modules for distributed computing that have excessive memory storage requirements and have excessive computationally requirements for many distributed computing environments, such as a distributed IoT computing environment. Distributed IoT computing environments would require lightweight orchestration in order to keep the ecosystem small, which may not be possible with existing solutions.

The aforementioned limitations become very relevant in the context of IoT, where it would be desirable to have in place orchestration mechanisms that allow the orchestration of services from the cloud all the way up to the IoT end-device (and passing through the network edge). For example, in the case of constrained devices running unikernel-based virtualized services, with current implementations it is not possible to control or manage remotely (e.g. from a service running in a cloud infrastructure) such instances, or even be aware of the hardware resource employed by the virtualized instances.

These problems are further illustrated, by there being no known orchestration infrastructure that can be used to manage the deployment of services using Unikernels. Even if a relatively constrained IoT electronic device (e.g. 500 Kbytes Flash, 32 MHz CPU) that runs a compatible OS (e.g. Mirage OS, RIOT OS, etc.) could run a process as a microservice, there is no mechanism today in the backend that is configured to determine the hardware capabilities of the IoT electronic device. Consequently, the orchestrator is not capable of determining the best profile, which would need to be customized to the hardware capabilities of a particular one of the IoT electronic devices, when demanded to build an executable image for processing by the particular one of the IoT electronic devices. The orchestrator is not capable of knowing the result once the executable image is pushed to the particular one of the IoT electronic devices, and cannot know other specific local information of the particular one of the IoT electronic devices (e.g. current battery, current busy/idle, online/offline). Also, characteristics of a distributed computing environment can rapidly change over time based on the present total sum of load on each of the IoT electronic devices. Previously known approaches would not enable collection of those information indicating those characteristics and, moreover, would not do so in a standardized manner.

For IoT computing environments, in particular, hyperscale is a key requirement that must be addressed especially from a data perspective. To support and elastically manage the possible huge amount of data that can be generated, transformed, and/or communicated through IoT computing environments, more finer service granularity is required compared to what microservice architecture are presently available. It is envisioned that Unikernel technology may contain the characteristics for providing such granularity and enable the above challenges to be addressed.

As of today LwM2M, a variant of CoAP, does not provide a mechanism that enables determination of the hardware characteristics of an electronic device, which limits the use of IoT electronic devices as "computational resources" for a distributed computing environment. Moreover, there does not presently exist a mechanism for orchestrating resources for Unikernel.

Introduction to the New Approaches

Various embodiments of the present disclosure are directed to enabling LwM2M protocol to determine the hardware characteristics of IoT electronic devices. Some further embodiments of the present disclosure are directed to configuring CoAP as an application protocol and REST as the communication paradigm to provides orchestration of services that are distributed for execution by IoT electronic devices which are communicatively interconnected in a distributed computing environment.

As will be explained below, the LwM2M protocol is modified to enable the computational resources on relatively constrained devices, e.g., Class 2 and above as per RFC7228. In some further embodiments, the modified LwM2M protocol bridges the Restful IoT world with the Unikernel world by using CoAP as the Application Protocol and LwM2M as the orchestration management tool with monitoring capabilities.

These approaches may overcome two presently identified limitations related to the use of virtualized instances of the IoT context and in constrained devices. First, these approaches may make it possible to expose to peer devices (e.g. other constrained devices or other constrained devices) and/or to expose to orchestrator nodes, the hardware resources employed by virtualized services while running on top of constrained devices. Second, these approaches may enable the orchestrator to effectively manage the usage of constrained devices, responsive to the orchestrator's knowledge of the resources used by the services.

Potential advantages of these approaches can include any one or more of: ability to reuse the existing IoT stack which is presently available on CoAP endpoints; ability to reuse the data model that is used in LwM2M by adding two new objects, which may be called HW-INFO and UNIKERNEL-DATA; ability to use the two new objects to expose hardware information; and ability to orchestrate Unikernel applications. These approaches enable applications to built on demand while being adapted depending on the targeted device's environment.

System-Level and Example Implementation-Level Approaches for Orchestrating Distribution of Services to IoT Electronic Devices The following discussion is divided into sections 1 and 2. Section 1 discloses an example system-level architecture containing an IoT service orchestration device that operates to orchestrate the distribution of executable services to a plurality of IoT electronic devices. The second section discloses example detailed LwM2M and CoAP operations by an orchestrator module and a manager module of the IoT service orchestration device which operate in combination with IoT electronic devices for orchestrating the distribution of executable services and for setting-up result notifications.

Section 1—System-Level Architecture and Operations

Figure 1:
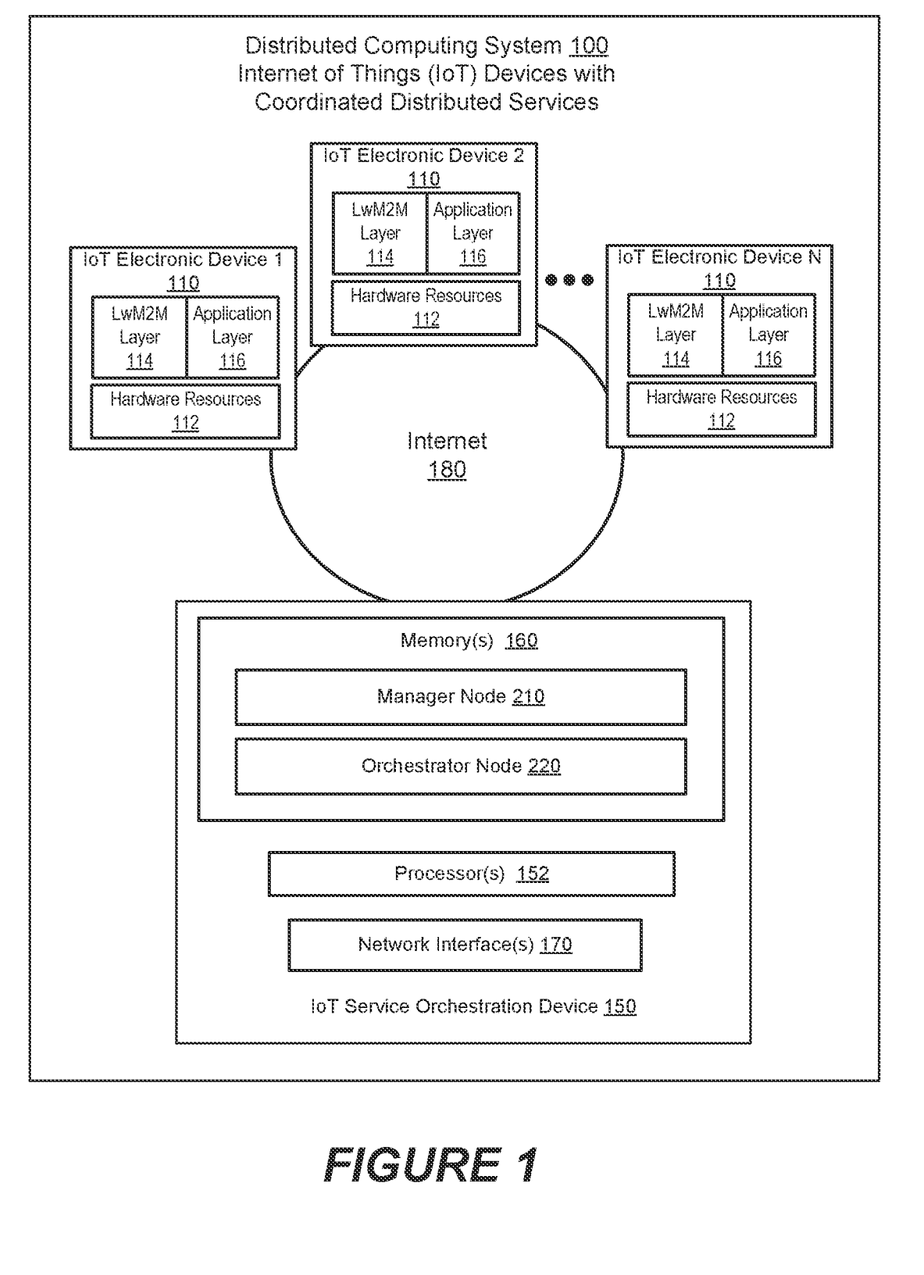
FIG. 1 is a block diagram of a distributed computing system having an IoT service orchestrator device providing coordinated distributed services to IoT electronic devices, in accordance with some embodiments.
Figure 2:
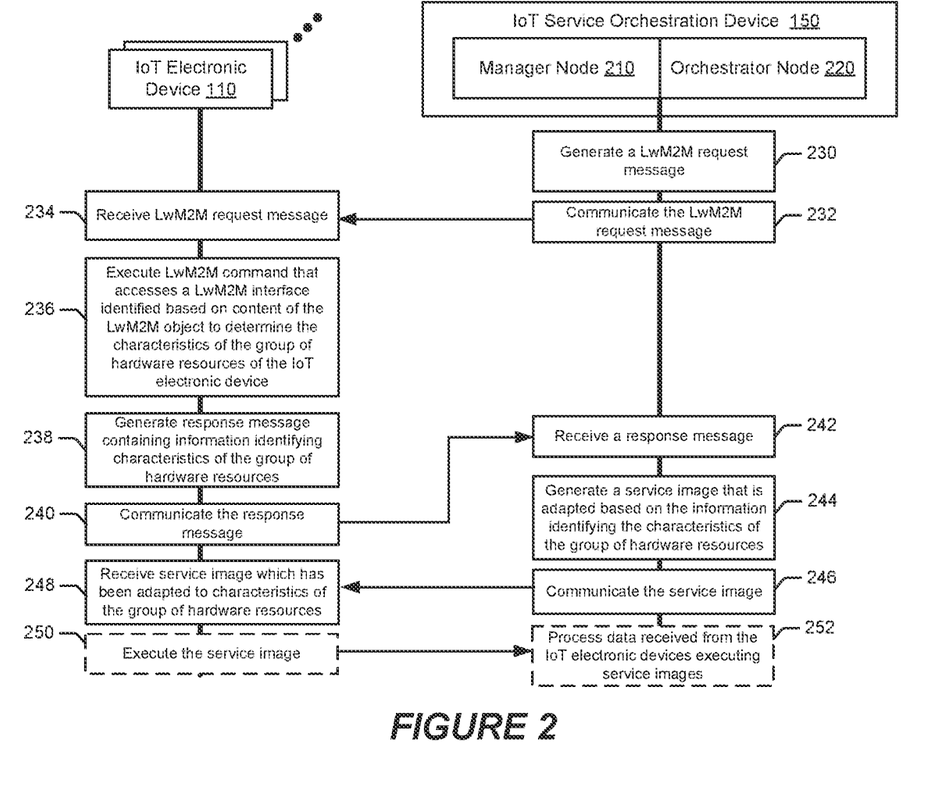
FIG. 2 is a combined flowchart and data flow diagram of operations by an IoT service orchestration device and an IoT electronic devices for distributing executable services in accordance with some embodiments.
Figure 3:
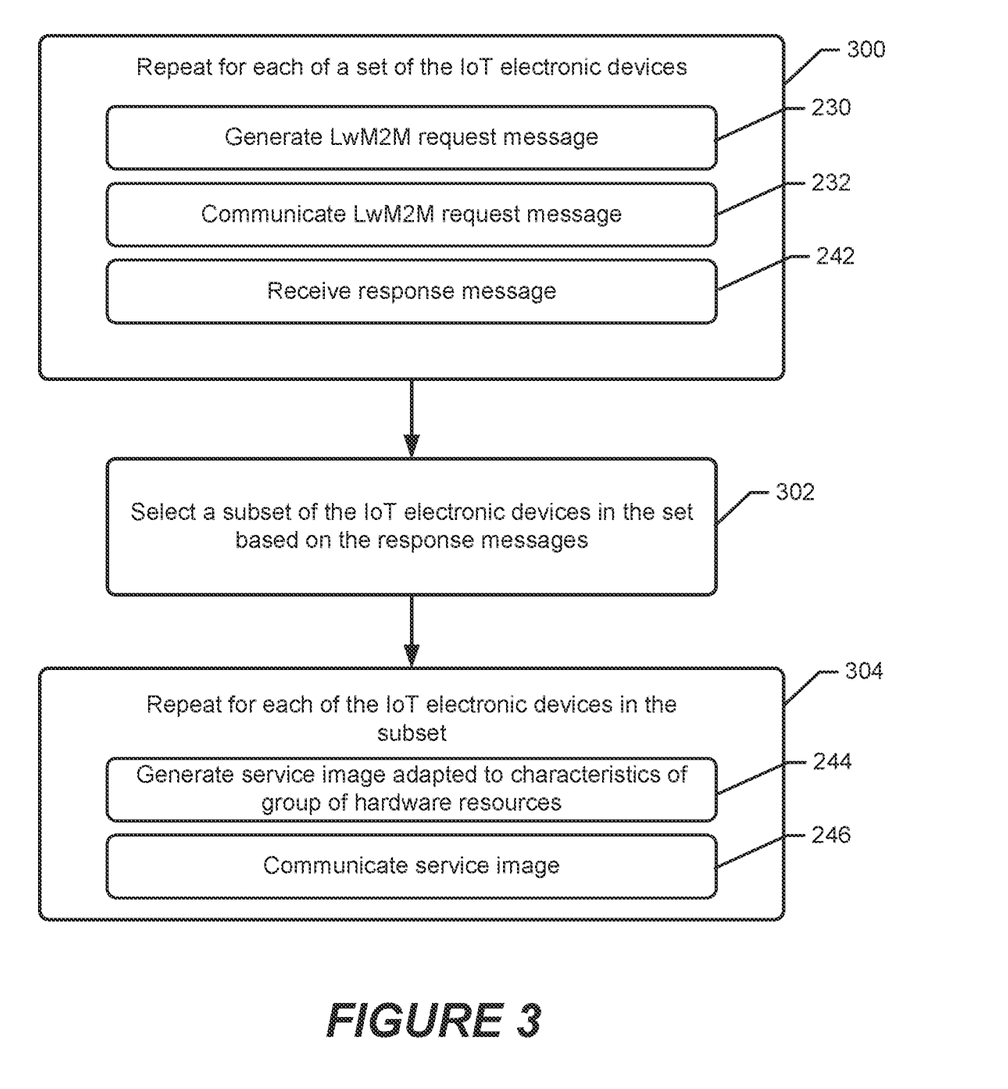
FIG. 3 is a flowchart that illustrates further operations by an IoT service orchestration device for orchestrating the distribution of executable services to IoT electronic devices, in accordance with some embodiments.
Figure 4:
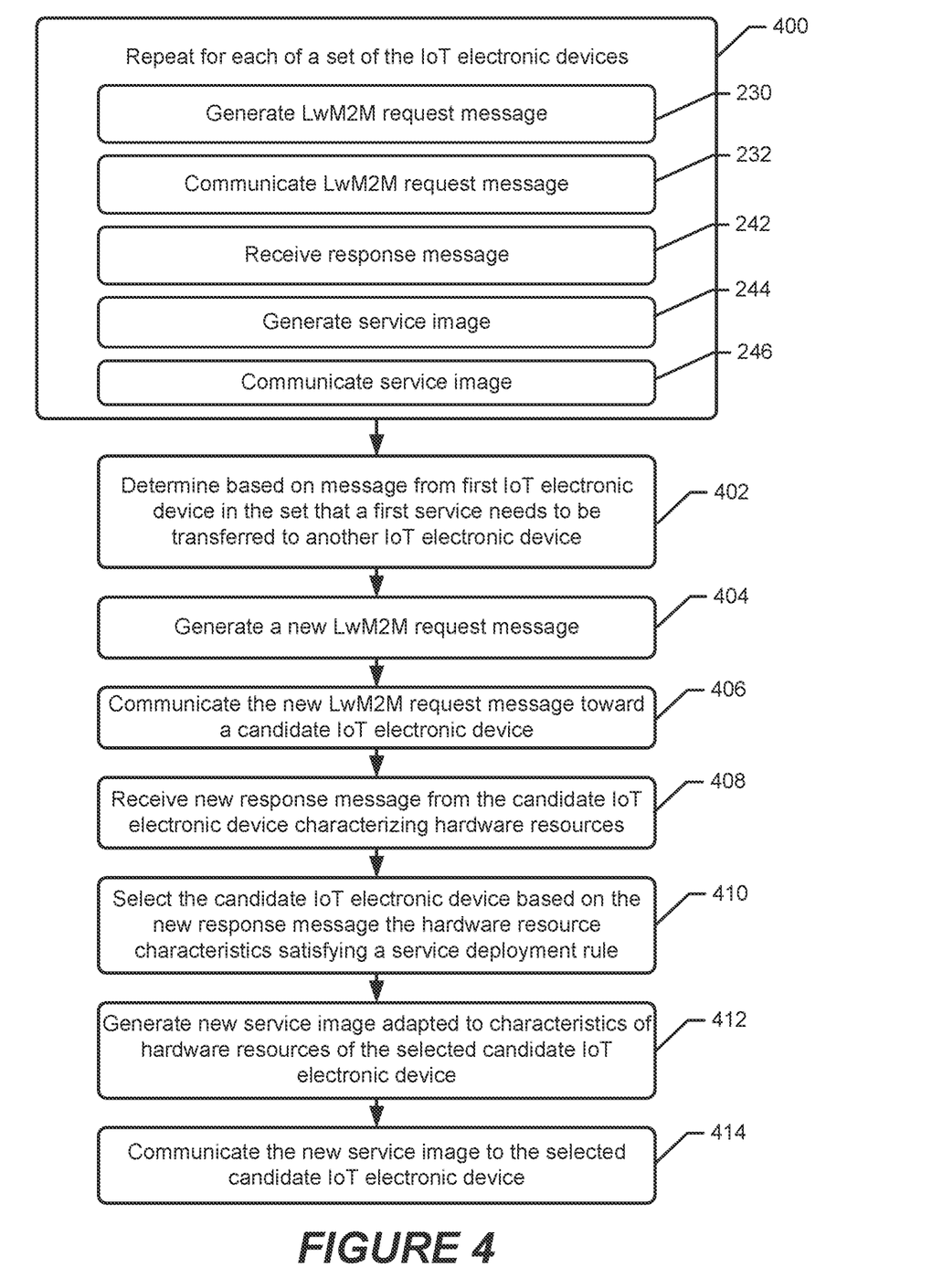
FIG. 4 is a flowchart that illustrates further operations by an IoT service orchestration device for orchestrating a transfer of an executable service from a first IoT electronic device to a candidate IoT electronic device that is s selected based on the candidate's hardware resource characteristics, in accordance with some embodiments.

An example system-level architecture containing an IoT service orchestration device 150 that operates to orchestrate the distribution of executable services to a plurality of IoT electronic devices 110 is explained below in the context of FIGS. 1 through 4 which configured in accordance with various embodiments of present disclosure. FIG. 1 is a block diagram of a distributed computing system 100 having an IoT service orchestrator device 150 that providing coordinated distributed services to IoT electronic devices 110. FIG. 2 is a combined flowchart and data flow diagram of operations by an IoT service orchestration device 150 and an IoT electronic devices 110 for distributing executable services. FIGS. 3 and 4 are flowcharts that illustrate further operations by an IoT service orchestration device 150 for orchestrating the distribution of executable services to IoT electronic devices 110.

Referring to FIG. 1, the example IoT service orchestrator device 150 includes at least one processor circuit 152 (referred to as a processor for brevity), at least one memory circuit 160 (referred to as a memory for brevity), at least one network interface 170 (referred to as a network interface for brevity). The network interface 170 is configured to communicate with the IoT electronic devices 110 through the Internet 180. The processor 152 may include one or more data processing circuits, such as a general purpose and/or special purpose processor (e.g., microprocessor and/or digital signal processor) that may be collocated or distributed across one or more networks. The processor 152 is configured to execute computer program code in the memory 160, described below as a non-transitory computer readable medium, to perform at least some of the operations described herein as being performed by an object recognition computer. The computer program code when executed by the processor 152 causes the processor with 52 to perform operations in accordance with one or more embodiments disclosed herein for the object recognition computer.

The computer program code can include a module that functions as a manager node 210 and a module that functions as an orchestrator module 220. Functions operations by the manager node 210 and orchestrator node 220 are described in detail below with regard to FIGS. 2 through 6. The manager node 210 and the orchestrator node 220 may be collocated or spaced apart and distributed across one or more networks. For example, the manager node 210 and the orchestrator node 220 may reside in the same physical memory device, e.g. a server device, or they may reside in separate inter-networked physical memory devices, e.g., different server devices that are operationally connected through the Internet 180 or another data network.

Each of the IoT electronic devices 110 contain hardware resources 112 which include processor circuits, network interface circuits, memory circuits, and other hardware elements that support execution of a LwM2M layer (e.g., agent) 114 and an application layer 116. The LwM2M layer 114 is a communication protocol from the Open Mobile Alliance built to provide a link between a device equipped with a LwM2M layer (agent) and LwM2M-enabled devices, such as LwM2M-enabled Internet servers.

Example operations by the IoT service orchestrator device 150 to distribute an executable service image to an IoT electronic device 110 are now explained in the context of FIG. 2. Although FIG. 2 illustrates the manager node 210 and the orchestrator module 220 as residing in the IoT service orchestrator device 150, the manager node 210 and the orchestrator node 220 may be collocated or distributed across one or more networks. For example, as explained above, the manager node 210 and the orchestrator node 220 may reside in the same physical memory device, e.g. a server device, or they may reside in separate inter-networked physical memory devices, e.g., different server devices that are operationally connected through the Internet 180 or another data network. Thus, in one embodiment the manager node 210 (also referred to as a manager operational node) and the orchestrator node 220 (also referred to as an orchestrator operational node) are performed by a single computer platform, and in another embodiment they are performed by physically separated computer platforms which are communicatively networked to each other. The manager node 210 can be configured to communicate through the Internet with the IoT electronic device 110. Functional operations of the manager node 210 and orchestrator node 220 are described in further detail below with regard to FIGS. 5 and 6.

Referring to FIG. 2, the IoT service orchestrator device 150 generates 230 a LwM2M request message containing a LwM2M object identifying a group of hardware resources for which characteristics are requested. The IoT service orchestrator device 150 communicates 232 the LwM2M request message through the Internet 180 directed toward an identified IoT electronic device 110 among the IoT electronic devices.

The identified IoT electronic device 110 receives 234 the LwM2M request message, and responsively executes 236 a LwM2M command that accesses a LwM2M interface identified based on content of the LwM2M object to determine the characteristics of the group of hardware resources of the IoT electronic device which are identified by the LwM2M object. As will be explained in further detail below, example characteristics of hardware resources that can be determined by the IoT electronic device 110 responsive to the LwM2M command can include, but are not limited to any one or more of: random access memory (RAM) type, storage size, available capacity, read and/or write speed, etc.; read only memory (ROM) type, storage size, available capacity, read and/or write speed, etc.; mass memory storage (e.g., disk drive, solid state flash drive, etc.) type, storage size, available capacity, read and/or write speed, etc.; speed of processor (e.g., CPU, GPU, DSP, etc.); maximum speed of processor (e.g., CPU, GPU, DSP, etc.); wired and/or wireless network interface input and/or output data rate; hardware manufacturer identifier; hardware model identifier; hardware unique identifier (e.g., serial number); available power sources; maximum battery charge capacity; remaining battery capacity; communication quality of service; and/or other hardware component metrics, identifiers, and/or other characteristics.

The identified IoT electronic device 110 generates 238 a response message containing information identifying the characteristics of the group of hardware resources of the IoT electronic device 110 which are determined through the LwM2M interface access. The identified IoT electronic device 110 then communicates 240 the response message through the Internet 180 directed toward the IoT service orchestrator device 150. The IoT service orchestrator device 150 receives 242 the response message, through the Internet from the identified IoT electronic device, containing information identifying the characteristics of the group of hardware resources.

The IoT service orchestrator device 150 generates 244 a service image that is adapted based on the information identifying the characteristics of the group of hardware resources, where the service image contains instructions that are executable by the identified IoT electronic device 110. The IoT service orchestrator device 150 then communicates 246 the service image through the Internet directed toward the identified IoT electronic device 110. The identified IoT electronic device 110 receives 248 the service image which has been adapted by the IoT service orchestrator device.

In some further optional operations, the IoT electronic device 110 executes 250 instructions obtained from the service image to perform one or more executable services that have been distributed by the IoT service orchestrator device 150 to the IoT electronic device 110. Example services can include, without limitation, any one or more of: providing a computing platform for performing an allocated part of a distributed computation; obtaining/generating data from one or more user interfaces and/or one or more sensors (e.g., camera, microphone, temperature sensor, pressure sensor, location sensor, electrical sensor, etc.), etc. Execution of the instructions from the service image can cause the IoT electronic device 110 to communicate 250 (output) data to the IoT service orchestrator device 150, which may then receive and process 252 the data. The IoT service orchestrator device 150 may receive data from a plurality of IoT electronic devices 110 which are performing one or more distributing services that are being orchestrated by the IoT service orchestrator device 150.

In a further embodiment, the operation by the IoT electronic device 110 to execute 236 the LwM2M command includes executing one of a Constrained Application Protocol (CoAP) command that accesses a CoAP interface or a Message Queuing Telemetry Transport (MQTT) command that accesses a MQTT interface. The one of the CoAP command and the MQTT command is identified based on content of the LwM2M object to determine the characteristics of the group of hardware resources of the IoT electronic device which are identified by the LwM2M object.

In another further embodiment, the operation by the IoT electronic device 110 to receive 234 the LwM2M request message includes performing LwM2M operations to receive the request message through the Internet which requests characteristics of the group of hardware resources identified by LwM2M object. Furthermore, the operation to communicate 240 the response message includes performing further LwM2M operations to communicate the response message through the Internet directed toward the IoT service orchestrator device.

In another further embodiment, the LwM2M object contained in the LwM2M request message is a hardware information object that identifies at least one of: RAM size; ROM size; CPU speed; and GPU speed, as the requested characteristic of a corresponding at least one of: RAM; ROM; CPU; and GPU resources of the IoT electronic device.

In another further embodiment, the operation by the IoT electronic device 110 to execute 236 the LwM2M command includes accessing the LwM2M interface to retrieve information from at least one memory location that identifies the characteristics of the at least one of: RAM size; ROM size; CPU speed; and GPU speed.

Some further embodiments are directed to the LwM2M object, which is contained in the LwM2M request message, being a UNIKERNEL data object. In one embodiment, the LwM2M object contained in the LwM2M request message is a UNIKERNEL data object that identifies at least one of: connectivity; network throughput; network latency; memory usage ratio; thermal history; battery level; bootup time; and image size, as the requested characteristic of hardware resources of the IoT electronic device. In another embodiment, the LwM2M object contained in the LwM2M request message is a UNIKERNEL data object that identifies at least one of manufacturer of the IoT electronic device; model of the IoT electronic device; and serial number of the IoT electronic device, as the requested characteristic of hardware resources of the IoT electronic device.

Some further example that can be performed by the IoT service orchestrator device 150 of FIG. 2 are now explained in the context of the examples of FIGS. 3 and 4.

FIG. 3 is a flowchart that illustrates further operations by the IoT service orchestration device 150 of FIG. 2 for orchestrating the distribution of executable services to a plurality of IoT electronic devices, in accordance with some embodiments. More particularly, the IoT service orchestrator device 150 can operate to deploy services to a subset of IoT devices by gathering hardware characteristics from a set of IoT devices and selecting the subset of IoT devices based on their hardware characteristics. For each of the IoT devices in the subset, a service image is generated that is adapted to the hardware characteristics of the particular IoT device.

Referring to FIG. 3, IoT service orchestration device 150 perform the operations to repeat 300 the generating 230 of the LwM2M request message, the communicating to 32 the LwM2M request message, and the receiving 242 of the response message, for each of a set of the IoT electronic devices. The device 150 selects 302 a subset of the IoT electronic devices in the set based on the response messages, received from each of the IoT electronic devices in the subset, containing information identifying characteristics of the group of hardware resources of the IoT electronic devices that satisfies at least one service deployment rule. The device 150 then performs operations to repeat 304 for each of the IoT electronic devices in the subset, operations to generate 244 a service image that is adapted based on the information identifying the characteristics of the group of hardware resources of the IoT electronic device in the subset, and operations to communicate 246 the service image through the Internet directed toward the identified IoT electronic device.

FIG. 4 is a flowchart that illustrates some additional or alternative operations by the IoT service orchestration device 150 of FIG. 2 for orchestrating a transfer of an executable service from a first IoT electronic device to a candidate IoT electronic device that was selected based on the candidate's hardware resource characteristics. The executable service which was adapted to the first IoT device is subsequently generated for transfer with an adaptation to the hardware resource characteristics of the candidate IoT electronic device.

Referring to FIG. 4, the IoT service orchestration device 150 is configured to perform operations to repeat 400 the generating 230 of the LwM2M request message, the communicating 232 the LwM2M request message, the receiving 242 of the response message, the generating 244 a service image, and the communicating 246 the service image, for each of a set of the IoT electronic devices. The IoT service orchestration device 150 determines 402 based on at least one message received from a first IoT electronic device in the set that a first service that was adapted to characteristics of the first IoT electronic device in the set, needs to be transferred to another IoT electronic device. The IoT service orchestration device 150 generates 404 a new LwM2M request message containing a LwM2M object identifying a group of hardware resources for which characteristics are requested. The IoT service orchestration device 150 communicates 406 the new LwM2M request message through the Internet directed toward a candidate IoT electronic device that is not among the set of IoT electronic devices. A new response message is received 408, through the Internet from the candidate IoT electronic device, containing information identifying the characteristics of the group of hardware resources of the candidate IoT electronic device. The IoT service orchestration device 150 selects 410 the candidate IoT electronic device based on the new response message containing information identifying the characteristics of the group of hardware resources of the candidate IoT electronic device that satisfies a service deployment rule, and generates 412 a new service image that is adapted based on the information identifying the characteristics of the group of hardware resources of the selected candidate IoT electronic device, wherein the new service image contains instructions that are executable by the selected candidate IoT electronic device. The IoT service orchestration device 150 then communicates 414 the new service image through the Internet directed toward the selected candidate IoT electronic device.

As explained above, the IoT service orchestrator device 150 includes a manager operational node and a orchestrator operational node that may be performed by a single computer platform or by physically separated computer platforms which are communicatively networked to each other. The manager operational node communicates through the Internet with the plurality of IoT electronic devices.

The operation by the IoT service orchestration device 150 to communicate 232 the request message can include performing LwM2M operations to communicate the LwM2M request message through the Internet toward the identified IoT electronic device requesting the characteristic of the group of hardware resources identified by the LwM2M object. The operation to received 242 the response message can include performing further LwM2M operations to receive the response message through the Internet from the identified IoT electronic device. The operation to communicate 246 the service image can include performing further LwM2M operations to communicate the service image through the Internet directed toward the identified IoT electronic device.

The LwM2M object, contained in the LwM2M request message, can be a hardware information object that identifies at least one of: RAM size; ROM size; CPU speed; and GPU speed, as the requested characteristic of a corresponding at least one of: RAM; ROM; CPU; and GPU resources of the IoT electronic device.

In one further embodiment, the LwM2M object, contained in the LwM2M request message, is a UNIKERNEL data object that identifies at least one of: connectivity; network throughput; network latency; memory usage ratio; thermal history; battery level; bootup time; and image size, as the requested characteristic of hardware resources of the IoT electronic device.

In another further embodiment, the LwM2M object, contained in the LwM2M request message, is a UNIKERNEL data object that identifies at least one of manufacturer of the IoT electronic device; model of the IoT electronic device; and serial number of the IoT electronic device, as the requested characteristic of hardware resources of the IoT electronic device.

Section 2—Detailed LwM2M and CoAP Operations

As explained above, some embodiments of the present disclosure are directed to using two new LwM2M Objects to enable an orchestrator node to discover hardware characteristics of IoT hardware devices, the new LwM2M Objects can be: HW-INFO and UNIKERNEL-DATA, which will contain respectively information of the hardware resources disposable on the device (HW-INFO) and the aggregate of that information with the connectivity, battery and other environment characteristics (UNIKERNEL-DATA).

For example, to offload Machine Learning (ML) training on an IoT electronic device having a GPU, the orchestrator node 220 can generate an image with Compute Unified Device Architecture (CUDA) to use the GPU. When an IoT electronic device does not have a GPU, the orchestrator node 220 can avoid space for CUDA by generating a smaller image with CPU only. When an IoT electronic device has large memory storage capabilities, the orchestrator node 220 can send data at first and then execute batch processing later with performance information, and when network throughput is high, the orchestrator node 220 can populate many unikernel IoT electronic devices to send data back and forth for calculation. With H/W-INFO and UNIKERNEL-DATA, the orchestrator node 220 can arrange tailor-made unikernel images and deploy to targeted IoT electronic devices to provide improved computational efficiency within the distributed computing environment.

Some other embodiments are directed to orchestrator node 220 serving as a master (e.g. orchestrator running in a cloud infrastructure), which operates to address a request coming from an IoT electronic device to off-loading the execution of a certain task to another candidate IoT electronic device. In this case, the orchestrator node 220 can query first the receiving candidate IoT electronic device for asking what its available resources are and then, on the basis of the expected resources to be used for executing that specific task (e.g. estimated through machine learning mechanisms), deciding whether accepting the off-loading request to that candidate IoT electronic device.

Below is a representation of both objects:
rw configuration data (read and write)
ro state data (read only)
x action OBJECT: HW-INFO
+—ro HW-INFO*[instance_number]
+—ro instance_number uint16
+—ro RAM (B) decimal64
+—ro ROM (B) decimal64
+—ro STORAGE (B) decimal64
+—rw MAXCPU (Mhz) decimal64
+—ro CPU (Mhz) decimal64
+—ro ARCH string In one embodiment, MAXCPU resource is determined and used to overclock an IoT electronic device in some situations, such as provided below.

OBJECT: UNIKERNEL-DATA+
+—ro UNIKERNEL-DATA*[instance_number]
+—rw instance_number uint16
+—rw HW-INFO obj_link
+—ro LWM2MServer(1) obj_link
+—ro Device(3) obj_link
+—ro Connectivity(4) obj_link
+—ro network throughput (bits/sec) decimal64
+—ro network latency (msec) decimal64
+—ro memory usage ratio (0.00) decimal64
+—ro thermal history decimal64
+—ro bootup time
+—ro image size
. . .
+—rw compi-image web_link Several resources from the LWM2M Server Object can be reused according to some embodiments, namely:
'/1/0/1' which is the lifetime of the registration as an integer.
'/1/0/2' which is the Default Minimum Period of the registration as an integer.
'/1/0/8' which is the executable resource of the registration trigger.

Operations can determine how long the hardware resources of the IoT electronic device will be available.

Operations can reuse several resources from the device Object, namely:
'/3/0/0' which is the manufacturer as a string.
'/3/0/1' which is the model as a string.
'/3/0/2' which is the serial number as a string.
'/3/0/6' which is the available power sources as a finite integer (i.e. 1=battery, 6=plugged to power).
'/3/0/9' which is the battery level as an integer from 0-100(%).
'/3/0/13' which is the current time in UNIX time.

Operations can reuse all resources from the Connectivity Monitoring Object:
'/4/0/0' which is the network bearer as an integer 0-50 (0-GSM, 7-nbiot, 22-bluetooth, 23-802.15.4 etc.)
'/4/0/2' which is the link quality as an integer.
'/4/0/4' which is the current IP address.

The resource "compi-image" contains the CoAP URL where the compiled image can be found (e.g. coaps://images.uniservice.com/dev1v2).

Figure 5:
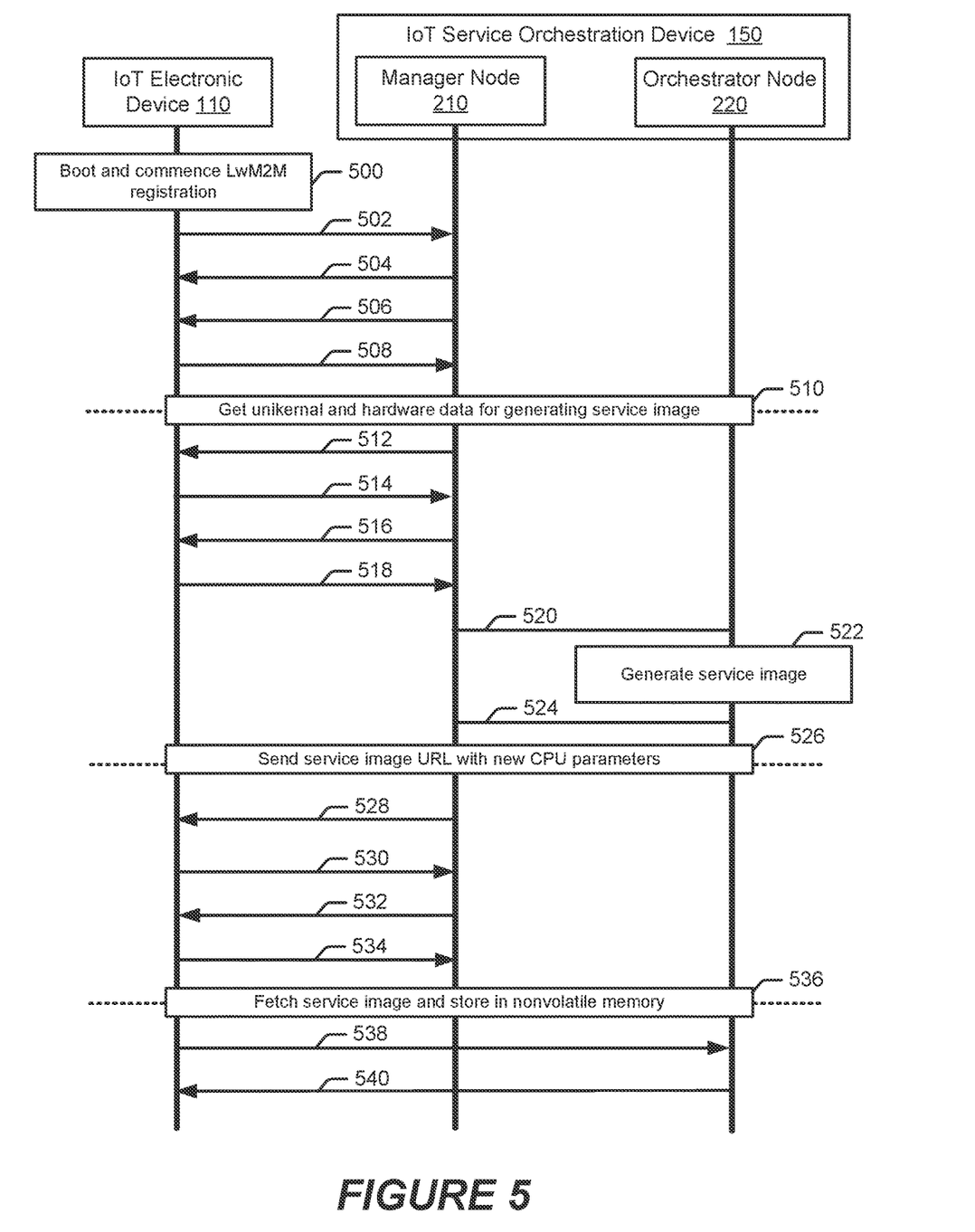
FIG. 5 is a combined flowchart and data flow diagram of LwM2M and CoAP operations by an orchestrator module and a manager module of an IoT service orchestration device for orchestrating the distribution of executable services in accordance with some embodiments.

FIG. 5 is a combined flowchart and data flow diagram of LwM2M and CoAP operations by an orchestrator module 220 and a manager module 210 of an IoT service orchestration device 150 for orchestrating the distribution of executable services to IoT electronic devices 110 in accordance with some embodiments. Operations of FIG. 5 are explained below.

The following operational sequence illustrates the use of the objects to first fetch the information from the IoT electronic devices 110 and then manage them as computational resources:

In operation 500, the IoT electronic device 110 boots and commences LwM2M registration.

In operation 502, the IoT electronic device 110 performs a simple registration (e.g., Post coap://(LS-ADDRESS)/rd?ep=urn:0001) as explained in the LwM2M specification at URL www.openmobilealliance.org/release/LightweightM2M/V1_1-20180710-A/HTML-Version/OMA-TS-LightweightM2M_Core-V1_1-20180710-A.html#6-2-0-62-Client-Registration-Interface.

In operation 504, the LwM2M Server discovers (e.g., 2.01 Created Location-Path: /rd/123) whether this capability is available at the LwM2M Client, this is necessary because the capability might not be mandatory to implement.

In operation 506, the manager node 210 discovers characteristics of the IoT electronic device 110, e.g., GET coap://[IPv6]/.well-known/core.

In operation 508, the IoT electronic device 110 responds with the contents of "/.well-known/core", which among other things contains the object "UNIKERNAL-DATA", e.g., 2.05 Content/UNIKERNAL-DATA.

```
Int: LS -> LC
Req: GET coap://[IPv6]/.well-known/core
Res: 2.05 Content
   </HW-INFO>;rt="oma.lwm2m";ct=110,
   </UNIKERNEL-DATA>;rt="oma.lwm2m";ct=110,
```

Operations 510 are performed to get unit kernel and hardware data for use in generating a targeted service image.

In operation 512, the LwM2M Server (manager node 210) performs a GET operation on that particular Object, e.g., GET coap://[IPv6]/UNIKERNAL-DATA.

In operation 514, the IoT electronic device 110 responds with a "2.05 Content" with the following SenML:

```
Int: LS -> LC
Req: GET coap://[IPv6]/UNIKERNEL-DATA
Res: 2.05 Content
   {"bn":"/XXXX/0/",
   "e":[
   {"n":"0","vlo":"/HW-INFO"},
   {"n":"1","vlo":"/1"},
   {"n":"2","vlo":"/3"},
   {"n":"3","vlo":"/4"},
   {"n":"4","v":"115200"},
   {"n":"5","v":"126"},
   {"n":"6","v":"60"},
   {"n":"7","v":"15"},
   {"n":"8","v":""},
   {"n":"9","v":""}]
   }
```

In operation 516, the manager node can then query for more detailed HW-INFO if needed, e.g., 2.05 Content+ SENML. In operation 518, the IoT electronic device 110 responds back to the manager node 210. Following information may be used.

```
Int: LS -> LC
Req: GET coap://[IPv6]/HW-INFO
Res: 2.05 Content
   {"bn":"/XXXX/0/",
   "e":[
   {"n":"0","v":"1048576"},
   {"n":"1","v":"1048576"},
   {"n":"2","v":"262144"},
   {"n":"3","v":"900"},
   {"n":"4","v":"1200"},
   {"n":"5","sv":"Cortex-A53"}
   }
```

The HW-INFO is communicated 520 from the manager node 210 to the orchestrator node 220.

In operation 522, the orchestrator node 220 generates an image tailored based on the hardware characteristics (HW-INFO) of the IoT electronic device 110, and sends 524 toward the IoT electronic device 110, via the manager node 210, a link to the tailored image.

Operations 526 send the service image URL with, e.g., new CPU parameters to be used by the IoT electronic device 110.

In operation 528, the manager node performs a POST operation, e.g., POST coap://[IPv6]/UNIKERNAL-DATA/0/compi-image, coaps://images.uniservice.com/dev1v2. to send the image URL to the IoT electronic device, as well as new configuration parameters to overclock the CPU in order to provide real time response. To perform the update we use the standard Firmware Over the Air (FOTA) update mechanism in LwM2M.

The IoT electronic device 110 responds 530 with a "2.04 changed", the manager node 210 posts 532 the new MAX CPU (e.g., POST coap://IPv61/UNIKERNAL-DATA/MAXCPU 200), the IoT electronic device 110 responds 534 with "20.4 changes", and then the IoT electronic device 110 overclocks the CPU to 1000 Mhz, while still below the hardware specification (1200 Mhz is the maximum hardware limit).

```
Int: LS -> LC
Req: POST coap://[IPv6]/UNIKERNEL-DATA/HW-INFO/compi-image
      coap://[IPv6]/UNIKERNEL-DATA/HW-INFO/MAXCPU
   {"bn":"/HW-INFO/0/",
   "e":[
   {"n":"3","v":"1000"},
   {"n":"9","vs":"coaps://images.uniservice.com/dev1v2"}]
   }
Res: 2.04 Changed
```

In operations 536-540 the IoT electronic device 110 fetches the service image from the orchestrator node 220, and stores the service image in the nonvolatile memory of the IoT electronic device 110. The IoT electronic device 110 gets the image from the URL using the CoAP Block Option, e.g., GET Block coaps:/images.uniservice.com/dev1v2, for larger payloads.

```
Int: LS -> Orchestrator
Req: GET coaps://images.uniservice.com/dev1v2
      <Opaque Image Data>
   Res: 2.04 Changed
```

A similar application would be to offload Machine Learning (ML) training on an IoT electronic device 110 having a GPU. The orchestrator node 220 can generate an image with Compute Unified Device Architecture (CUDA) to use the GPU instead of a CPU.

If a IoT electronic device 110 doesn't have a GPU, the orchestrator node 220 can some space in the generated image that is configured for processing by a CPU only. If an IoT electronic device 110 has a substantial memory storage capability, the orchestrator node 220 can send data at first and then execute batch processing later with performance information. If the network throughput is high, the orchestrator node 220 can populate several unikernel IoT electronic devices 110 to send data back and forth for calculation.

Accordingly, using objects HW-INFO and UNIKERNEL-DATA enables the generation of tailor-made unikernel images and different deployments based on the specific current hardware characteristics of the targeted IoT electronic devices, in an efficient and timely manner Notification Usage An added feature of the use of CoAP and LwM2M for Unikernels is that observations can be set on the IoT electronic device 110, to create conditional responses if some thresholds change as a consequence of a change in the state of the IoT electronic device 110.

For example the orchestrator node 220 could set an observation (see URL tools.ietf.org/html/rfc7641) to the battery level object '/3/0/9' and the signal strength '/4/0/2', obtained as characteristics of a IoT electronic device, so that when the battery is below 30% or the Signal Strength is above −80 decibels (dbM) a notification is sent. Signal strengths can range from approximately −30 dBm to −110 dBm. The closer that number is to 0, the stronger the cell signal. The battery level resource contains the current battery level as a percentage (with a range from 0 to 100).

Figure 6:
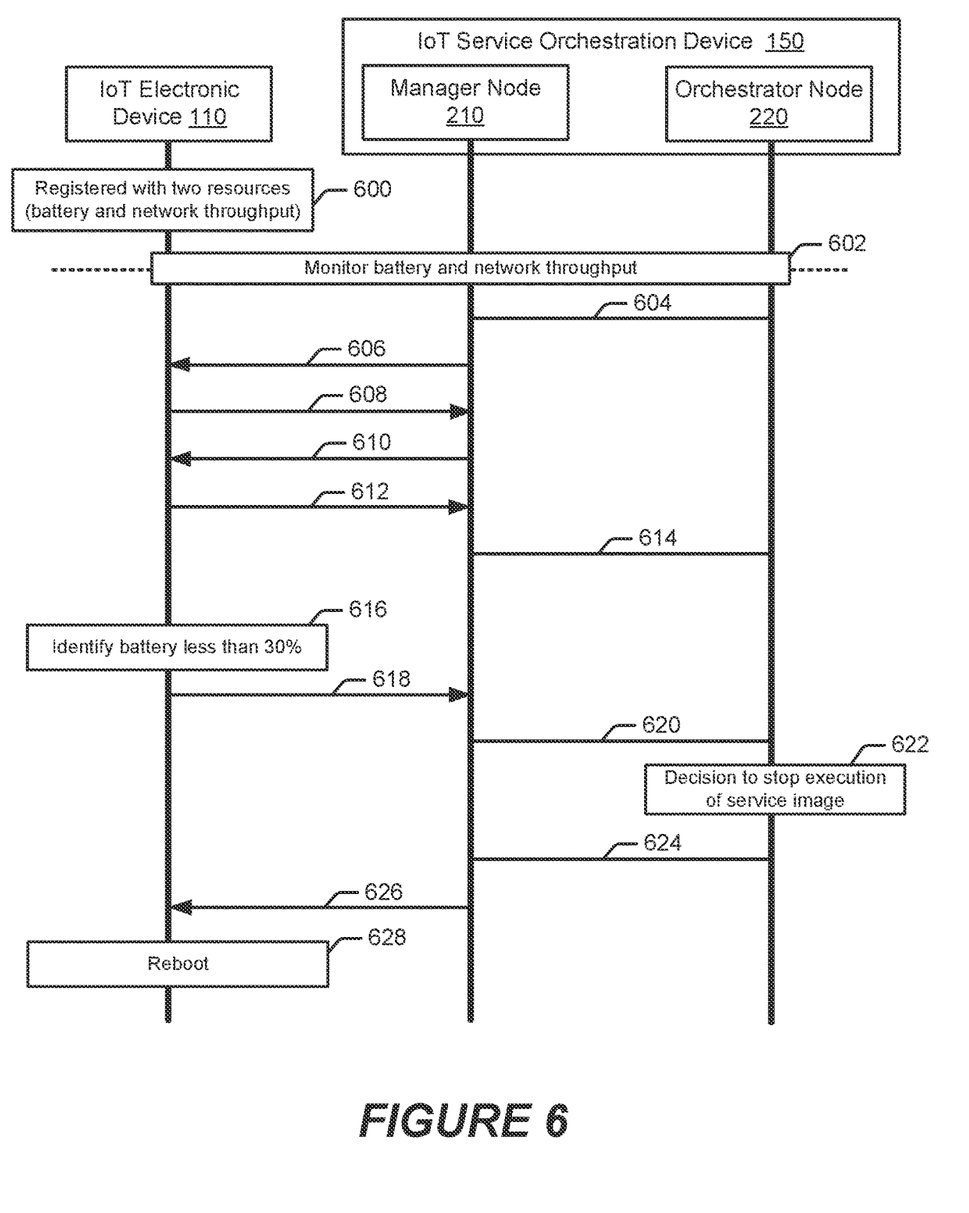
FIG. 6 is a combined flowchart and data flow diagram of LwM2M and CoAP operations by the orchestrator module and the manager module of the IoT service orchestration device which operate in combination with an IoT electronic device of FIG. 5 for setting-up result notifications following distribution of the executable services according to FIG. 5, in accordance with some embodiments.

FIG. 6 is a combined flowchart and data flow diagram of LwM2M and CoAP operations by the orchestrator module 220 and the manager module 210 of the IoT service orchestration device 150 which operate in combination with an IoT electronic device 110 of FIG. 5 for setting-up result notifications following distribution of the executable services according to FIG. 5, in accordance with some embodiments. Operations of FIG. 6 are explained below.

In operations 602-614 the IoT electronic device 110 registers with two types of hardware resources, battery and network throughput. The IoT service orchestrator device 150 monitors the battery and network throughput characteristics of the IoT electronic device 110.

In operation 604, the orchestrator device 220 specifies some configuration parameters to the manager node to 10, e.g., IPC Send Configuration.

In operations 606 and 610, the manager node 210 sets an Observation over the battery and the signal strength, requesting to be notified if the battery is below 30% or the Signal Strength is above −80 decibels (dbM), e.g., GET+Observe coap://[IPv6]/3/0/9?lt=30. In operations 608 and 612, the IoT electronic device 110 confirms the observations, e.g., 2.05 Content+SENML, and sends the current values (i.e. 95% and −30 dbM)

Int: LS→LC
Req: GET observe coap://[IPv6]/3/0/9?lt=30
Res: 2.05 Content (95)
Int: LS→LC
Req: GET observe coap://[IPv6/4/0/2?gt=−80
Res: 2.05 Content (−30)

In operation 614, the manager node 210 confirms to the orchestrator node 220, e.g., Confirm Configuration.

After some time has passed, the battery decreases to 25% and the IoT electronic device identifies 616 that it's battery capacity has dropped below 30%. In operation 618, the IoT electronic device 110 send sends object data characterizing the battery capacity, e.g., 2.05 Content+SENML (25% battery), to the manager node 210. The manager node 210 responsively forwards 620 the data to the orchestrator node 220, e.g., IPC Send Data.

Res: 2.05 Content (25)

In operation 622, the orchestrator node 220 response to the reported low battery capacity by deciding to stop the execution of the service by the IoT electronic device 110, and notifies 624 the manager node 210, e.g., IPC Send Command. The manager node 210 forwards 626 the command to the IoT electronic device 110, e.g., POST coap://[IPv6]/3/0/4. In this case, an example command could be to Reboot, which in LwM2M it is the resource '/3/0/4'

Int: LS→LC
Req: POST coap://[IPv6]/3/0/4
Res: 2.05 Content (95)

In operation 628, the IoT electronic device 110 reboots responsive to the received command Assuming that there is a stateless service, the orchestrator node 220 can then launch the service, which has been shut-down on the IoT electronic device 110, on another IoT electronic device 110.

Example IoT Electronic Device

Figure 7:
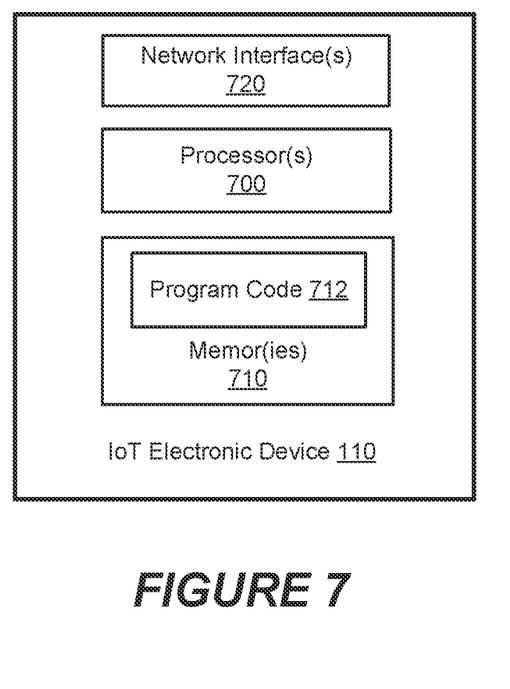
FIG. 7 is a block diagram of an IoT electronic device containing elements that are configured according to some embodiments.

FIG. 7 is a block diagram of an IoT electronic device 110 containing elements that are configured according to some embodiments. The IoT electronic device 110 can include one or more network interfaces 720 (referred to as "network interface" for brevity), one or more processors 700 (referred to as "processor" for brevity), and one or more memories 710 (referred to as "memory" for brevity) containing program code 712.

The processor 700 may include one or more data processing circuits, such as a general purpose and/or special purpose processor (e.g., microprocessor and/or digital signal processor) that may be collocated or distributed across one or more networks. The processor 700 is configured to execute program code 712 in the memory 710, described below as a computer readable medium, to perform some or all of the operations and methods that are described above for one or more of the embodiments of an IoT electronic device, such as regarding one or more of the embodiments described in the context of any one or more of FIGS. 1 through 6.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method by an Internet of Things (IoT) electronic device for executing services distributed by an IoT service orchestration device to a plurality of the IoT electronic devices, the method comprising:
   receiving a Lightweight Machine-to-Machine (LwM2M) request message through the Internet from the IoT service orchestration device, wherein the LwM2M request message contains a LwM2M object identifying a group of hardware resources of the IoT electronic device for which characteristics are requested, wherein the LwM2M object, contained in the LwM2M request message, is a UNIKERNEL data object that identifies at least one of: connectivity; network throughput; network latency; memory usage ratio; thermal history; battery level; bootup time; and image size, as the requested characteristic of hardware resources of the IoT electronic device;
   executing a LwM2M command that accesses a LwM2M interface identified based on content of the LwM2M object to determine the characteristics of the group of hardware resources of the IoT electronic device which are identified by the LwM2M object;
   generating a response message containing information identifying the characteristics of the group of hardware resources of the IoT electronic device which are determined through the LwM2M interface access;
   communicating the response message through the Internet directed toward the IoT service orchestrator device; and
   receiving a service image which has been adapted by the IoT service orchestrator device, responsive to the information in the response message identifying the characteristics of the group of hardware resources of the IoT electronic device, for execution by the IoT electronic device.

2. The method of claim 1, wherein:
   the IoT service orchestrator device comprises a manager operational node and a orchestrator operational node that are performed by a single computer platform or by physically separated computer platforms which are communicatively networked to each other, wherein the manager operational node communicates through the Internet with the IoT electronic device.

3. The method of claim 1, further comprising:
   executing the service image using hardware resources in the group to generate data; and
   communicating the data through the Internet directed toward the IoT service orchestrator device.

4. The method of claim 1, wherein the execution of the LwM2M command comprises:
   executing one of a Constrained Application Protocol, CoAP, command that accesses a CoAP interface or a Message Queuing Telemetry Transport, MQTT, command that accesses a MQTT interface, wherein the one of the CoAP command and the MQTT command is identified based on content of the LwM2M object to determine the characteristics of the group of hardware resources of the IoT electronic device which are identified by the LwM2M object.

5. The method of claim 1, wherein:
   the receiving of the LwM2M request message comprises performing LwM2M operations to receive the request message through the Internet which requests characteristics of the group of hardware resources identified by LwM2M object; and
   the communicating of the response message comprises performing further LwM2M operations to communicate the response message through the Internet directed toward the IoT service orchestrator device.

6. The method of claim 1, wherein:
   the LwM2M object, contained in the LwM2M request message, is a hardware information object that identifies at least one of: RAM size; ROM size; CPU speed; and GPU speed, as the requested characteristic of a corresponding at least one of: RAM; ROM; CPU; and GPU resources of the IoT electronic device.

7. A method by an Internet of Things (IoT) electronic device for executing services distributed by an IoT service orchestration device to a plurality of the IoT electronic devices, the method comprising:
   receiving a Lightweight Machine-to-Machine (LwM2M) request message through the Internet from the IoT service orchestration device, wherein the LwM2M request message contains a LwM2M object identifying a group of hardware resources of the IoT electronic device for which characteristics are requested, wherein the LwM2M object, contained in the LwM2M request message, is a UNIKERNEL data object that identifies at least one of: manufacturer of the IoT electronic device; model of the IoT electronic device; and serial number of the IoT electronic device, as the requested characteristic of hardware resources of the IoT electronic device;
   executing a LwM2M command that accesses a LwM2M interface identified based on content of the LwM2M object to determine the characteristics of the group of hardware resources of the IoT electronic device which are identified by the LwM2M object;

generating a response message containing information identifying the characteristics of the group of hardware resources of the IoT electronic device which are determined through the LwM2M interface access;

communicating the response message through the Internet directed toward the IoT service orchestrator device; and receiving a service image which has been adapted by the IoT service orchestrator device, responsive to the information in the response message identifying the characteristics of the group of hardware resources of the IoT electronic device, for execution by the IoT electronic device.

8. A method by an Internet of Things (IoT) service orchestration device for distributing services via the Internet to a plurality of IoT electronic devices, the method comprising:

generating a Lightweight Machine-to-Machine (LwM2M) request message containing a LwM2M object identifying a group of hardware resources for which characteristics are requested, wherein the LwM2M object, contained in the LwM2M request message, is a UNIKERNEL data object that identifies at least one of: connectivity; network throughput; network latency; memory usage ratio; thermal history; battery level; bootup time; and image size, as the requested characteristic of hardware resources of the IoT electronic device;

communicating the LwM2M request message through the Internet directed toward an identified IoT electronic device among the IoT electronic devices;

receiving a response message, through the Internet from the identified IoT electronic device, containing information identifying the characteristics of the group of hardware resources determined through execution of a LwM2M command by the identified IoT electronic device based on the LwM2M object;

generating a service image that is adapted based on the information identifying the characteristics of the group of hardware resources, wherein the service image contains instructions that are executable by the identified IoT electronic device; and communicating the service image through the Internet directed toward the identified IoT electronic device.

9. The method of claim 8, further comprising:

repeating the generating of the LwM2M request message, the communicating the LwM2M request message, and the receiving of the response message, for each of a set of the IoT electronic devices;

selecting a subset of the IoT electronic devices in the set based on the response messages, received from each of the IoT electronic devices in the subset, containing information identifying characteristics of the group of hardware resources of the IoT electronic devices that satisfies at least one service deployment rule; and repeating for each of the IoT electronic devices in the subset,
generating a service image that is adapted based on the information identifying the characteristics of the group of hardware resources of the IoT electronic device in the subset; and
communicating the service image through the Internet directed toward the identified IoT electronic device.

10. The method of claim 8, further comprising:

repeating the generating of the LwM2M request message, the communicating the LwM2M request message, the receiving of the response message, the generating a service image, and the communicating the service image, for each of a set of the IoT electronic devices;

determining based on at least one message received from a first IoT electronic device in the set that a first service that was adapted to characteristics of the first IoT electronic device in the set, needs to be transferred to another IoT electronic device;

generating a new LwM2M request message containing a LwM2M object identifying a group of hardware resources for which characteristics are requested;

communicating the new LwM2M request message through the Internet directed toward a candidate IoT electronic device that is not among the set of IoT electronic devices;

receiving a new response message, through the Internet from the candidate IoT electronic device, containing information identifying the characteristics of the group of hardware resources of the candidate IoT electronic device;

selecting the candidate IoT electronic device based on the new response message containing information identifying the characteristics of the group of hardware resources of the candidate IoT electronic device that satisfies a service deployment rule;

generating a new service image that is adapted based on the information identifying the characteristics of the group of hardware resources of the selected candidate IoT electronic device, wherein the new service image contains instructions that are executable by the selected candidate IoT electronic device; and communicating the new service image through the Internet directed toward the selected candidate IoT electronic device.

11. The method of claim 8, wherein:

the IoT service orchestrator device comprises a manager operational node and a orchestrator operational node that are performed by a single computer platform or by physically separated computer platforms which are communicatively networked to each other, wherein the manager operational node communicates through the Internet with the plurality of IoT electronic devices.

12. The method of claim 8, wherein:

the communicating of the request message comprises performing LwM2M operations to communicate the LwM2M request message through the Internet toward the identified IoT electronic device requesting the characteristic of the group of hardware resources identified by the LwM2M object;

the receiving of the response message comprises performing further LwM2M operations to receive the response message through the Internet from the identified IoT electronic device; and the communicating of the service image comprises performing further LwM2M operations to communicate the service image through the Internet directed toward the identified IoT electronic device.

13. The method of claim 8, wherein:

the LwM2M object, contained in the LwM2M request message, is a hardware information object that identifies at least one of: RAM size; ROM size; CPU speed; and GPU speed, as the requested characteristic of a corresponding at least one of: RAM; ROM; CPU; and GPU resources of the IoT electronic device.

14. A method by an Internet of Things (IoT) service orchestration device for distributing services via the Internet to a plurality of IoT electronic devices, the method comprising:
- generating a Lightweight Machine-to-Machine (LwM2M) request message containing a LwM2M object identifying a group of hardware resources for which characteristics are requested, wherein the LwM2M object, contained in the LwM2M request message, is a UNIKERNEL data object that identifies at least one of: manufacturer of the IoT electronic device; model of the IoT electronic device; and serial number of the IoT electronic device, as the requested characteristic of hardware resources of the IoT electronic device;
- communicating the LwM2M request message through the Internet directed toward an identified IoT electronic device among the IoT electronic devices;
- receiving a response message, through the Internet from the identified IoT electronic device, containing information identifying the characteristics of the group of hardware resources determined through execution of a LwM2M command by the identified IoT electronic device based on the LwM2M object;
- generating a service image that is adapted based on the information identifying the characteristics of the group of hardware resources, wherein the service image contains instructions that are executable by the identified IoT electronic device; and
- communicating the service image through the Internet directed toward the identified IoT electronic device.

* * * * *